United States Patent
Tortora et al.

(10) Patent No.: US 11,257,385 B2
(45) Date of Patent: Feb. 22, 2022

(54) DRONE STRUCTURE FOR THE TRANSPORT OF TEMPERATURE-CONTROLLED MATERIAL

(71) Applicant: ABZERO SRLS, Pisa (IT)

(72) Inventors: Giuseppe Roberto Tortora, Pisa (IT); Andrea Cannas, Lotzorai (IT)

(73) Assignee: ABZERO SRLS, Pisa (IT)

( * ) Notice: Subject to any disclaimer, the term of this patent is extended or adjusted under 35 U.S.C. 154(b) by 188 days.

(21) Appl. No.: 16/637,749

(22) PCT Filed: Aug. 9, 2018

(86) PCT No.: PCT/IB2018/056012
§ 371 (c)(1),
(2) Date: Feb. 8, 2020

(87) PCT Pub. No.: WO2019/030707
PCT Pub. Date: Feb. 14, 2019

(65) Prior Publication Data
US 2020/0312162 A1     Oct. 1, 2020

(30) Foreign Application Priority Data

Aug. 9, 2017 (IT) .................. 102017000092580

(51) Int. Cl.
*G08G 5/00* (2006.01)
*B64C 39/02* (2006.01)
(Continued)

(52) U.S. Cl.
CPC ......... *G08G 5/0069* (2013.01); *B64C 39/024* (2013.01); *G05D 1/0011* (2013.01);
(Continued)

(58) Field of Classification Search
CPC .. G08G 5/0069; G08G 5/0039; G08G 5/0091; B64C 39/024; B64C 2201/042;
(Continued)

(56) References Cited

U.S. PATENT DOCUMENTS

| 2014/0180914 A1 | 6/2014 | Abhyanker |
| 2016/0253908 A1 | 9/2016 | Chambers et al. |

(Continued)

*Primary Examiner* — Thomas G Black
*Assistant Examiner* — Anthony M Gartrelle
(74) *Attorney, Agent, or Firm* — Maschoff Brennan

(57) ABSTRACT

A system for carrying a load at a controlled temperature includes a drone structure having a motor that handles the drone structure, an energy unit that delivers electric energy, and a control unit. The drone structure also includes a thermal container having an insulating casing with at least one layer of heat-insulating material, an inner temperature sensor that measures a value of temperature $T_{int}$ internal to the insulating casing, an outer temperature sensor configured to measure a value of temperature $T_{ext}$ external to the insulating casing, and a thermal unit arranged to adjust or keep constant the value of temperature $T_{int}$. The control unit is adapted to carry out an acquisition of a flight mission comprising a landing position of the drone structure, a time limit $t_{max}$ to reach the landing position and a condition on the values of the temperature $T_{int}$ to keep during the flight mission.

10 Claims, 3 Drawing Sheets

(51) Int. Cl.
*G05D 1/00* (2006.01)
*G05D 1/10* (2006.01)

(52) U.S. Cl.
CPC .......... *G05D 1/101* (2013.01); *G08G 5/0039* (2013.01); *G08G 5/0091* (2013.01); *B64C 2201/042* (2013.01); *B64C 2201/128* (2013.01); *B64C 2201/146* (2013.01); *B64C 2201/18* (2013.01)

(58) Field of Classification Search
CPC ........ B64C 2201/128; B64C 2201/146; B64C 2201/18; G05D 1/0011; G05D 1/101
See application file for complete search history.

(56) References Cited

U.S. PATENT DOCUMENTS

| | | | |
|---|---|---|---|
| 2016/0284221 A1 | 9/2016 | Hinkle et al. | |
| 2017/0363349 A1* | 12/2017 | McHale | F25D 29/003 |
| 2018/0096294 A1* | 4/2018 | Winkle | G06Q 10/0832 |
| 2018/0346225 A1* | 12/2018 | Winkle | B65D 81/18 |
| 2019/0340569 A1* | 11/2019 | Prager | G06Q 10/0832 |

* cited by examiner

DRONE STRUCTURE FOR THE TRANSPORT OF TEMPERATURE-CONTROLLED MATERIAL

FIELD OF THE INVENTION

The present invention relates to the transport of special material, for example organic material, which needs to be preserved under specific temperature conditions.

In particular, the invention relates to a drone structure able to guarantee, during transport, the aforementioned temperature conditions.

DESCRIPTION OF THE PRIOR ART

In recent years, with the increasing improvement of technologies, we have witnessed a substantial increase in goods transported by drones. This is due to the fact that drones, both in urban and extra-urban areas, allow a transport faster, less expensive and without the need of human operators on board. In particular, this type of transport makes it possible to avoid traffic in the city, quickly cross unpaved areas, overcome natural or artificial architectural obstacles, enter buildings, and so on.

For this reason, transport by drones is now developing a lot also in the postal sector and in general for the delivery of small goods.

For this reason we started to feel the need to transport organic material by drones, or in general medical material, being able to exploit the speed of transport in order to increase the effectiveness of an emergency intervention, such as a blood transfusion.

Two examples are given by the US Company Zipline, which has implemented a blood transport system in Rwanda, and by the Swiss Post, which is instead experimenting with a system for transportation of laboratory sample between two hospitals.

In both cases, however, the major technical problem lies in keeping the material transported under certain precise thermal conditions. This problem is partially overcome by the use of thermally insulating containers and by taking advantage of the short average duration of the flight.

However, the thermal conditions to which certain products must be maintained are often required by the relevant regulations and must be guaranteed in a secure manner and with a higher reliability than that one guaranteed by the current insulating containers. In addition, often drones must be able to act in very different climatic conditions, with external temperatures that can greatly change the rate of lowering of the temperature at which the load is exposed, making it even more difficult to ensure proper temperature maintenance.

Moreover, the autonomy of this type of transport is increasing thanks to the increasing techniques of optimization and generation of energy in flight, in addition to the increase in capacity of the sources of electrical energy on board. Therefore it is easy to predict that flight times and distances covered by drones will increase steadily over the next few years, highlighting the aforementioned problem of maintaining the load under precise thermal conditions.

A possible solution is shown in US2014180914A1, which describes a method, a device and a system for the transport of commercial products by means of a drone within a neighbourhood network. Thanks to a temperature control module, the system is able to keep the load transported at a predetermined temperature or humidity. Moreover, the described drone is able to show the user the maximum distance that the drone is able to travel or the time necessary for the arrival.

However, the device described in US2014180914A1 does not estimate such parameters as a function of the consumption due to the thermal unit, and therefore to the maintenance of the temperature. This does not allow the system to predict whether or not the drone will be able to complete its mission by ensuring compliance with the thermal conditions required by the established regulations, for example, in the case of transport of human organic material, such as blood or organs.

SUMMARY OF THE INVENTION

It is therefore a feature of the present invention to provide a drone structure for ensuring the maintenance of the transported load under predetermined temperature values, regardless of the external climatic conditions.

It is also a feature of the present invention to provide such a drone structure that allows constant and remote monitoring of compliance with the set mission parameters.

These and other objects are achieved by a system for carrying a load at a controlled temperature, said system comprising at least one drone structure comprising:
 at least one motor arranged to move the drone structure;
 an energy unit arranged to deliver electric energy;
 a thermal container comprising:
  an insulating casing comprising at least one layer of heat-insulating material;
  at least one inner temperature sensor configured to measure a value of temperature $T_{int}$ internal to the insulating casing;
  at least one outer temperature sensor configured to measure a value of temperature $T_{ext}$ external to the insulating casing;
  a thermal unit arranged to adjust or keep constant the value of temperature $T_{int}$;
said system comprising a control unit adapted for carrying out:
 an acquisition of a flight mission comprising:
  a landing position of the drone structure;
  a time limit $t_{max}$ to reach the landing position;
  a condition on the values of the temperature $T_{int}$ to keep during the flight mission;
 an acquisition of the temperature values $T_{int}$ and $T_{ext}$;
 an acquisition of a value of energy $E_{res}$ available in the energy unit;
 a calculation of a value of energy $E_{eng}$ to provide to said at least one motor for bringing the drone structure in the landing position with time limit $t_{max}$;
whose main feature is that the control unit is also adapted for carrying out:
 a calculation of a value of energy $E_{term}$ to provide to the thermal unit in order to respect the condition on the values of the temperature $T_{int}$ to keep during the flight mission;
 a calculation of a value of overall energy $E_{mis}=E_{eng}+E_{term}$ necessary to complete the flight mission;
 a comparison between the values of energy $E_{res}$ and $E_{mis}$;
and that the control unit is programmed in such a way that:
 if $E_{res} \geq E_{mis}$ then the control unit carries out at least one of the following actions:
  command to said at least one motor to proceed with the flight mission;

transmission of a signal of sufficient energy, in particular sent by means of a warning light and/or a warning sound and/or a remote transmission;

waiting for an order by an operator and/or by a control remote unit;

if $E_{res} < E_{mis}$ then the control unit carries out at least one of the following actions:

change of the flight mission according to a predetermined algorithm;

implementation of strategies for reducing the value of the overall energy $E_{mis}$ and following new comparison between the values of energy $E_{res}$ and $E_{mis}$;

transmission of a signal of insufficient energy, in particular sent by means of a warning light and/or a warning sound and/or a remote transmission;

abort of the mission;

waiting for an order by an operator and/or by a control remote unit.

This way, the drone structure allows, on the contrary of the prior art, to monitor and possibly modify the temperature at which the load is maintained. Furthermore, the drone structure allows a real-time evaluation of whether the energy on board is sufficient to guarantee the maintenance of the desired thermal conditions, allowing the mission to be carried out only if these conditions are met.

In this way, it is also possible to provide the control unit with different degrees of autonomy in solving the problem, depending on the use, the type of mission and/or the type of load carried.

In particular, at least two structures of drone are provided and the control unit is adapted to carry out an acquisition of a value of energy $E_{res}$ available in the energy unit of each drone structure, for comparing each value of energy $E_{res}$ acquired with the value of $E_{mis}$ and selecting a drone structure having the value of energy $E_{res}$ closest to said value $E_{mis}$.

Advantageously, the strategies of reduction of value of overall energy $E_{mis}$ comprise alternatively, or in combination:

opening at least one inlet present on the thermal container and arranged to allow an air flow to enter in direct contact with the layer of heat-insulating material;

changing the flight altitude;

changing the flight vertical speed;

looking for air currents at a lower temperature respect to a predetermined value of temperature.

Advantageously, the insulating casing is divided inside in at least two compartment and the thermal unit is adapted to control the value of temperature $T_{int}$ independently in each compartment. This way, in case that the load does not occupy the whole thermal container but only one compartment, it is possible to reduce the value of energy $E_{term}$ necessary to keep the load at the desired temperature.

In particular, a geo-localization system is provided for supplying the position of the thermal container remotely.

Advantageously, at least one solar panel is provided arranged to supply electrical energy to the energy unit.

In particular, the thermal container is constrained in a removable way to the drone structure. In this way it is possible to easily remove the thermal container from the drone structure and transport it more easily once the mission is complete, always keeping the load at the desired temperature. Moreover, this aspect allows to re-use the drone structure with different thermal containers, reducing the time between one mission and another.

In particular, the energy unit comprises an auxiliary energy source integral to the thermal container. This further facilitates the maintenance of the desired temperature in the container, even when it is removed from the remaining part of the drone structure.

Advantageously, the thermal container comprises a device for locking and unlocking the opening. This allows, for example, to prevent unauthorized personnel from gaining access to the load.

In particular, the system comprises a ground station and each drone structure is wirelessly connected with said ground station so as to periodically send data concerning all the flight conditions of the drone structure. More specifically, it can be sent data concerning the position of the drone, the conditions of the thermal container and the contained load, the environmental parameters detected by the drone sensors, the status of the energy sources, etc. This information can be used in real time to monitor the transport of the load and, possibly, to modify the parameters of the mission, so as to guarantee the quality standards of the transport even in case of inconveniences not foreseen during setting up the flight mission.

In this way, in case of transport of blood, for example, the system is able to analyse, during, before and after transport, the available information concerning the quality of the blood itself. Such information is promptly compared with a database, containing the specific regulations required, stored locally or remotely, making it possible to activate specific actions (e.g. activation of mechanical agitation or specific actuators) and controls (sensor activation, temperature setting, enabling information sending) based on the parameters to be met according to the regulations.

Advantageously, the system evaluates the weight of the transported cargo and compares it with what has been declared, in order to verify the actual consistency of the information and to perform the energy calculation considering also this information.

According to another aspect of the invention, a thermal container for carrying a load at a controlled temperature is claimed, said thermal container arranged to be constrained in a removable way to a drone structure, said drone structure comprising:

at least one motor arranged to move the drone structure;

energy unit arranged to deliver electric energy;

said thermal container comprising:

a control unit;

an insulating casing comprising at least one layer of heat-insulating material;

at least one inner temperature sensor configured to measure a value of temperature $T_{int}$ in the insulating casing;

at least one outer temperature sensor configured to measure a value of temperature $T_{ext}$ external to the insulating casing;

an thermal unit arranged to adjust or keep constant value of temperature $T_{int}$;

whose main feature is that the control unit is adapted to carry out:

an acquisition of a flight mission comprising:

a landing position of the drone structure;

a time limit $t_{max}$ to reach the landing position;

a condition on the values of the temperature $T_{int}$ to keep during the flight mission;

an acquisition of the temperature values $T_{int}$ and $T_{ext}$;

an acquisition of a value of energy $E_{res}$ available in the energy unit;

a calculation of a value of energy $E_{eng}$ to provide to the at least one motor for bringing the drone structure in the landing position in the time limit $t_{max}$;

a calculation of a value of energy $E_{term}$ to provide to the thermal unit in order to respect the condition on the values of the temperature $T_{int}$ to keep during the flight mission;

a calculation of a value of overall energy $E_{mis}=E_{eng}+E_{term}$ necessary to complete the flight mission;

a comparison between the values of energy $E_{res}$ and $E_{mis}$.

BRIEF DESCRIPTION OF THE DRAWINGS

Further characteristic and/or advantages of the present invention are more bright with the following description of an exemplary embodiment thereof, exemplifying but not limitative, with reference to the attached drawings in which.

DESCRIPTION OF A PREFERRED EXEMPLARY EMBODIMENT

Figure 1:
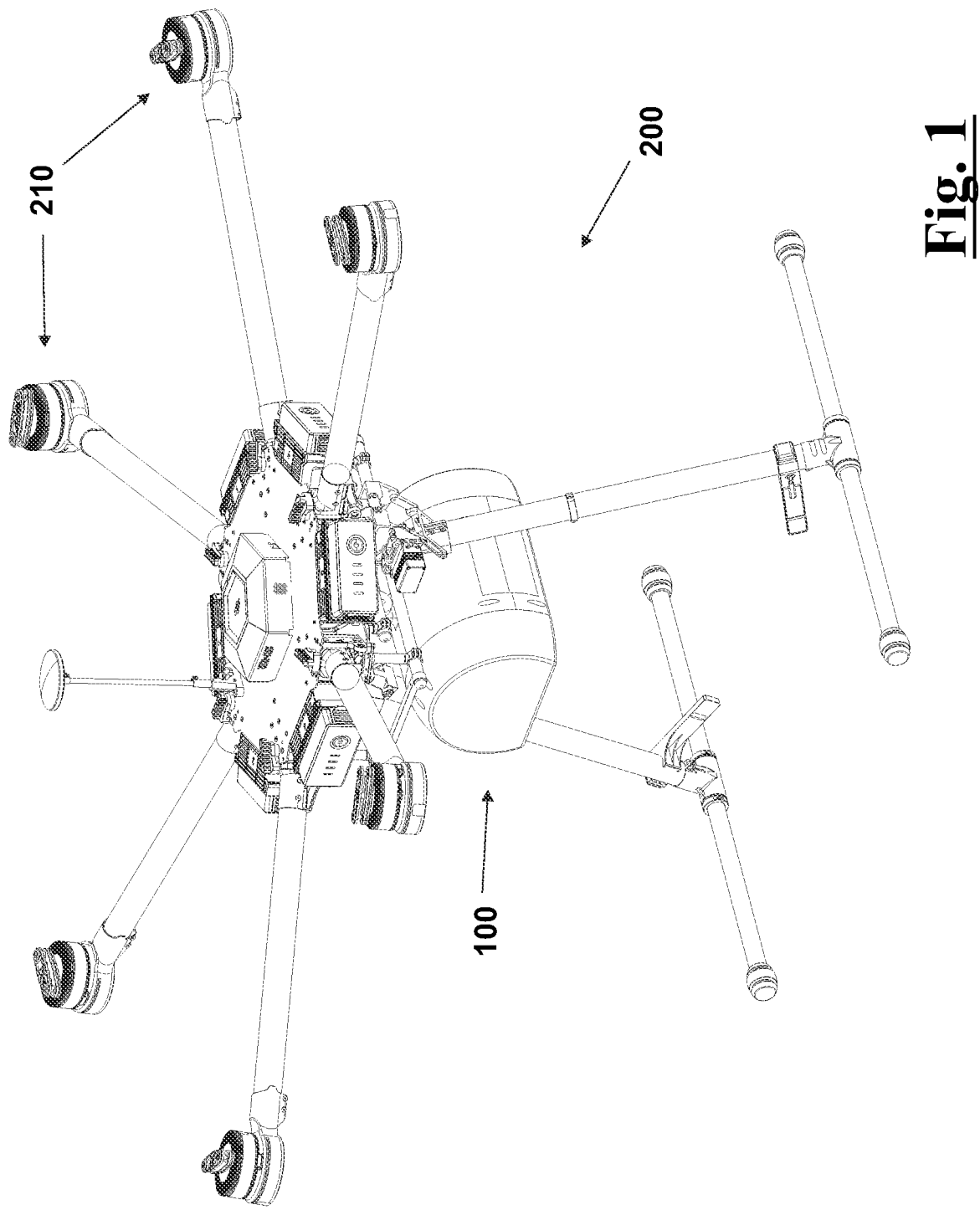
FIG. 1 shows a perspective view of a possible exemplary embodiment of the drone structure according to the present invention.
Figure 2:
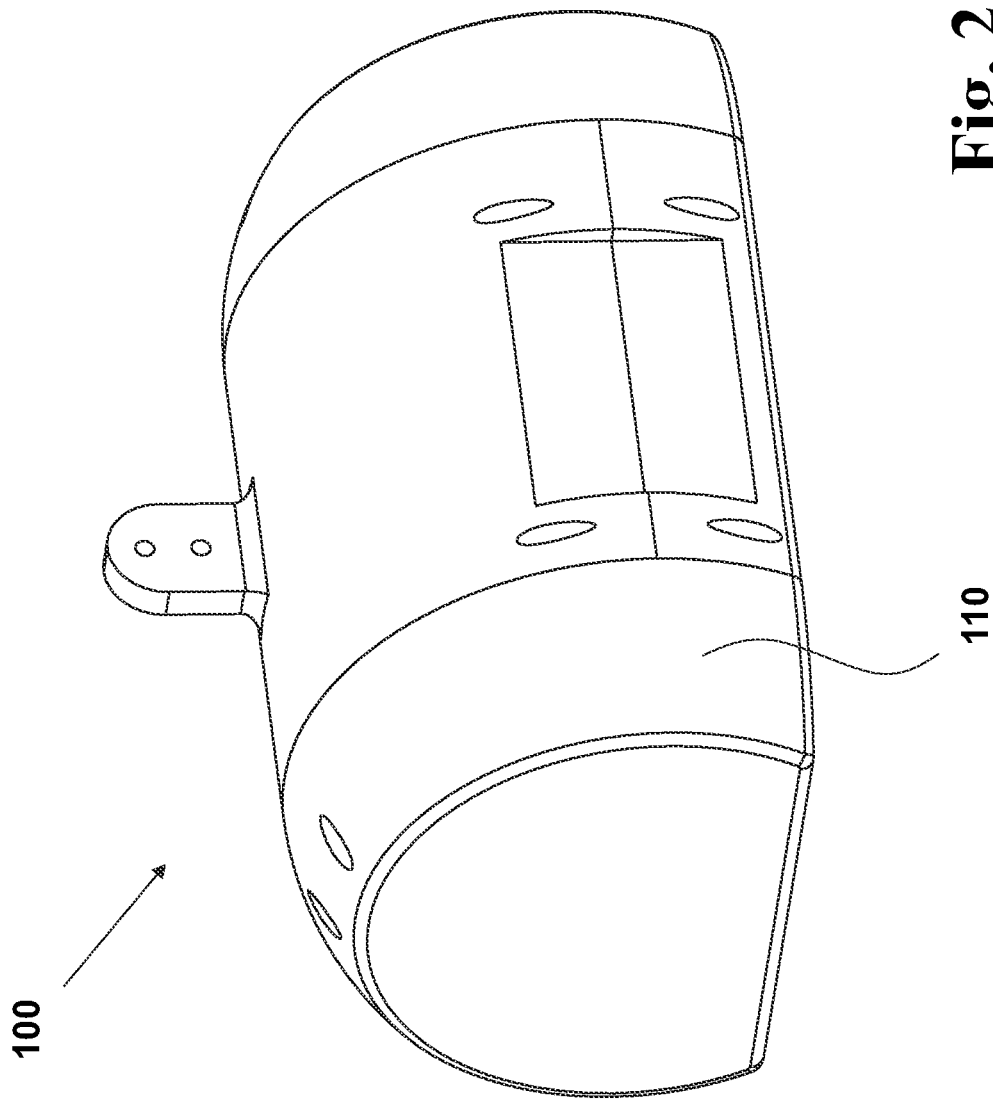
FIG. 2 shows a perspective view of a possible exemplary embodiment of the thermal container, according to the present invention.

With reference to FIGS. 1 and 2, in a thereof exemplary embodiment, the drone structure 200 according to the present invention comprises six motors 210 arranged to move the drone itself, an energy unit arranged to supply electric energy and a control unit.

Furthermore, the drone structure 200 comprises a thermal container 100 having an insulating casing 110 made of insulating material, at least one inner temperature sensor configured to measure a value of temperature $T_{int}$ in the insulating casing 110, and at least one outer temperature sensor configured to measure a value of temperature $T_{ext}$ external to the insulating casing 110. Furthermore, the container 100 comprises a thermal unit arranged to adjust or keep constant the value of temperature $T_{int}$.

Figure 3:
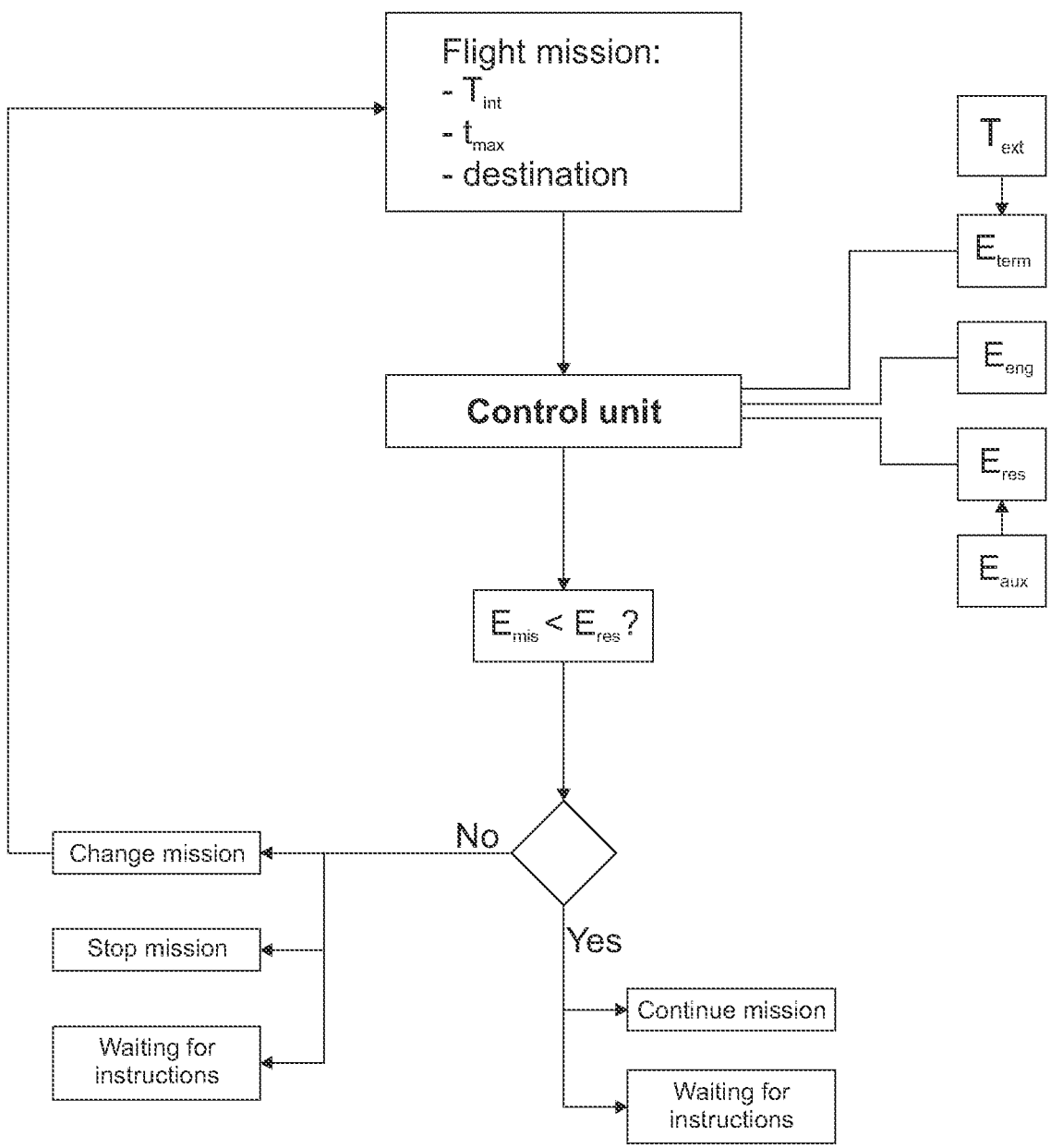
FIG. 3 shows a logical diagram of the process of processing information by the control unit.

With reference to the diagram of FIG. 3, the control unit is able to evaluate whether it is possible to transport a controlled temperature load, ensuring compliance with the regulations and flight mission, given the real-time values of some parameters.

In particular, the unit receives as input a flight mission where they are specified:

the landing position of the drone 200;

the time limit $t_{max}$ to reach the landing position;

a condition on the values of the temperature $T_{int}$ to keep during the flight mission: this condition is, for example, given on the basis of regulations in force.

Given the flight mission, the control unit can calculate the energy $E_{eng}$ to be supplied to the motors 210 to bring the drone 200 to the landing position in the time limit $t_{max}$. Furthermore, acquiring the values of $T_{int}$ and $T_{ext}$ by the respective temperature sensors, the control unit can process the energy value $E_{term}$ to provide to the thermal unit in order to respect the condition on the values of the temperature $T_{int}$ to keep during the flight mission. This way, the control unit can calculate the value of overall energy necessary to complete the flight mission:

$$E_{mis}=E_{eng}+E_{term}$$

The control unit acquires finally the value of energy residual $E_{res}$ present in the energy unit. If an auxiliary power source is also available on board the container 100, in addition to the main one, the control unit also acquires the residual energy value $E_{aux}$ that would increase value of $E_{res}$.

In light of the previous processing, the control unit finally evaluates whether it is possible to complete the mission or not, comparing the values of $E_{res}$ and $E_{mis}$.

In case that occurs the condition $E_{res} \geq E_{mis}$, the control unit can be programmed to automatically continue the mission, giving the corresponding commands to the 210 engines, or to send a signal of sufficient energy, e.g. by either light or remote transmission, and waiting for instructions from an operator or another control unit.

In case, instead, which occurs the condition $E_{res}<E_{mis}$, the control unit can be programmed to perform various operations, including:

change of the flight mission according to a predetermined algorithm;

implementation of strategies of reduction of the value of overall energy $E_{mis}$, for example changing the flight altitude, opening the inputs for air flow on the container 100, changing the vertical speed of the drone, looking for cold currents of air, and so on;

emission of a signal of insufficient energy and waiting for an order by an operator or by another control unit;

abort of the mission.

This way, the control unit always ensures compliance with the regulations for the transport of the load, such as for example blood, organs or laboratory material that must be kept within certain temperature ranges.

The foregoing description some exemplary specific embodiments will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realise the different functions described herein could have a different nature without, for this reason, departing from the field of the invention. it is to be understood that the phraseology or terminology that is employed herein is for the purpose of description and not of limitation.

The invention claimed is:

1. A system for carrying a load at a controlled temperature, said system comprising at least one drone structure including:

at least one motor arranged to move said drone structure;

an energy unit arranged to deliver electric energy;

a thermal container comprising:

an insulating casing comprising at least one layer of heat-insulating material;

at least one inner temperature sensor configured to measure a value of temperature $T_{int}$ internal to said insulating casing;

at least one outer temperature sensor configured to measure a value of temperature $T_{ext}$ external to said insulating casing;

a thermal unit arranged to adjust or keep constant said value of temperature $T_{int}$; and a control unit adapted for carrying out:

an acquisition of a flight mission comprising:

a landing position of said drone structure;

a time limit $t_{max}$ to reach said landing position;

a condition on the values of said temperature $T_{int}$ to keep during said flight mission;

an acquisition of said temperature values $T_{int}$ and $T_{ext}$;

an acquisition of a value of energy $E_{res}$ available in said energy unit;

a calculation of a value of energy $E_{eng}$ to provide to said at least one motor for bringing said drone structure in said landing position in said time limit $t_{max}$;

wherein:

said control unit is also adapted for carrying out:

a calculation of a value of energy $E_{term}$ to provide to said thermal unit in order to respect said condition on the values of said temperature $T_{int}$ to keep during said flight mission;

a calculation of a value of overall energy $E_{mis}=E_{eng}+E_{term}$ necessary to complete said flight mission; and a comparison between said values of energy $E_{res}$ and $E_{mis}$; and said control unit is programmed in such a way that:

if $E_{res} \geq E_{mis}$ then said control unit carries out at least one of the following actions:

command to said at least one motor to proceed with said flight mission;

transmission of a signal of sufficient energy, in particular sent by means of a warning light and/or a warning sound and/or a remote transmission; and waiting for an order by an operator and/or by a control remote unit; and if $E_{res}<E_{mis}$ then said control unit carries out at least one of the following actions:

change of said flight mission according to a predetermined algorithm;

implementation of strategies for reducing said value of said overall energy $E_{mis}$ and following new comparison between said values of energy $E_{res}$ and $E_{mis}$;

transmission of a signal of insufficient energy, in particular sent by means of a warning light and/or a warning sound and/or a remote transmission;

abort of said mission; and waiting for an order by an operator and/or by a control remote unit.

2. The system, according to claim 1, wherein:

at least two structures of drone are provided; and said control unit is arranged to carry out an acquisition of a value of energy $E_{res}$ available in said energy unit of each drone structure, in order to compare each value of energy $E_{res}$ acquired with said value of $E_{mis}$ and select a drone structure having the value of energy $E_{res}$ closer to said value $E_{mis}$.

3. The system, according to claim 1, wherein said strategies of reduction of said value of overall energy $E_{mis}$ comprise alternatively, or in combination:

opening at least one inlet present on said thermal container and arranged to allow an air flow to enter in direct contact with said layer of heat-insulating material;

changing the flight altitude;

changing the flight vertical speed; and/or search of air currents at a lower temperature respect to a predetermined value of temperature.

4. The system, according to claim 1, wherein:

said insulating casing is divided inside in at least two compartments; and said thermal unit is adapted to control said value of temperature $T_{int}$ independently in each of said compartments.

5. The system, according to claim 1, wherein a geo localization system is provided adapted to provide in remote the position of said thermal container.

6. The system, according to claim 1, wherein at least one solar panel is provided arranged to provide electric energy to said energy unit.

7. The system, according to claim 1, wherein said thermal container comprises a locking and unlocking device.

8. The system, according to claim 1, wherein said thermal container is constrained in a removable way to said drone structure.

9. The system, according to claim 8, wherein said energy unit comprises an auxiliary energy source integral to said thermal container.

10. A thermal container for carrying a load at a controlled temperature, said thermal container arranged to be constrained in a removable way to a drone structure, said drone structure including:

at least one motor arranged to move said drone structure;

an energy unit arranged to deliver electric energy;

said thermal container comprising:

a control unit;

an insulating casing comprising at least one layer of heat-insulating material;

at least one inner temperature sensor configured to measure a value of temperature $T_{int}$ in said insulating casing;

at least one outer temperature sensor configured to measure a value of temperature $T_{ext}$ external to said insulating casing; and a thermal unit arranged to adjust or keep constant said value of temperature $T_{int}$;

wherein said control unit is adapted to carry out:

an acquisition of a flight mission comprising:

a landing position of said drone structure;

a time limit $t_{max}$ to reach said landing position;

a condition on the values of said temperature $T_{int}$ to keep during said flight mission;

an acquisition of said temperature values $T_{int}$ and $T_{ext}$;

an acquisition of a value of energy $E_{res}$ available in said energy unit;

a calculation of a value of energy $E_{eng}$ to provide to said at least one motor for bringing said drone structure in said landing position in said time limit $t_{max}$;

a calculation of a value of energy $E_{term}$ to provide to said thermal unit in order to respect said condition on the values of said temperature $T_{int}$ to keep during said flight mission;

a calculation of a value of overall energy $E_{mis}=E_{eng}+E_{term}$ necessary to complete said flight mission; and a comparison between said values of energy $E_{res}$ and $E_{mis}$.

* * * * *